Figure 1:
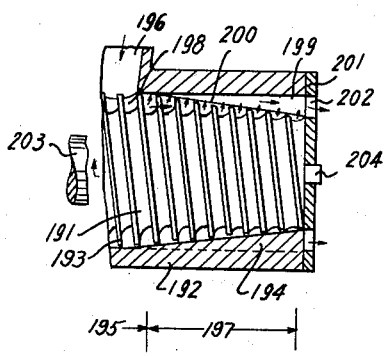

Sept. 3, 1963 M. S. FRENKEL 3,102,717
ENFORCED ORDER MIXING APPARATUS
Filed Nov. 13, 1957

INVENTOR.
MEYER S. FRENKEL
BY
ATTORNEY

United States Patent Office 3,102,717
Patented Sept. 3, 1963

3,102,717
ENFORCED ORDER MIXING APPARATUS
Meyer Schlioma Frenkel, London, England, assignor to Frenkel C-D Aktiengesellschaft, Vaduz, Liechtenstein, a company of Liechtenstein
Filed Nov. 13, 1957, Ser. No. 696,293
Claims priority, application Great Britain Nov. 15, 1956
9 Claims. (Cl. 259—7)

The present invention relates to a mixing apparatus of the type disclosed in my co-pending application for U.S. Patent Serial No. 592,472, filed June 18, 1956, now abandoned. Such apparatus operates according to the convergence-divergence principle, i.e. in such a manner that in two co-axial components provided with conveying grooves facing each other, a medium to be mixed is forwarded from the grooves of the one component to the grooves of the other in a giver-and-taker action. The invention according to the mentioned application provides for grooves of helical conformation in both components. However, I have found that such an arrangement, in certain instances, calls for a higher driving power than commensurate with the job performed. Therefore, it is an object of the present invention to provide an apparatus of the mentioned type with helical grooves in only one of the components whereas the grooves of the other component are straight, i.e. the flanks of these grooves are located in planes either parallel or radial in relation to the axis of the components. Thereby the friction of the medium to be mixed can be more or less reduced. Preferably the component with the straight grooves is stationary whereas the component with the helical groove is rotatable.

Either one of the rotatable and stationary components may surround the other one wherein the stationary component has the straight flanked grooves or straight vanes.

It is another object of the invention to provide an apparatus wherein the crests of the flanks of the grooves are located on flat planes normal to the common axis of the components wherein the groove in the rotatable component has spiral form whereas the flanks of the grooves of the stationary component are straight and preferably radial with respect to that axis.

Another object of the invention is the provision of a mixing apparatus having three co-axial components of which the outer and inner components are stationary and have straight flanked grooves whereas the intermediate component is rotatable and has a helical groove or helical grooves.

The invention further contemplates to provide apparatus of the mentioned type with a horizontal axis of the components useful e.g. as a continuous mixer and another apparatus of the mentioned type with a vertical axis of the components for use e.g. as a batch mixer or stirrer.

Further objects and details of the invention will be apparent from the description given hereinafter and the accompanying drawing illustrating several embodiments thereof by way of example.

Figure 2:
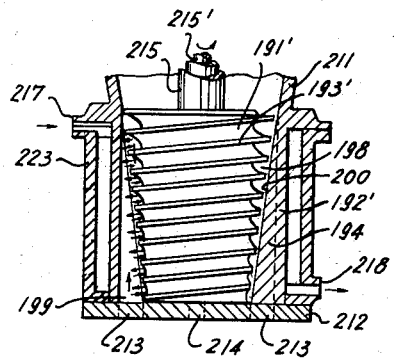
Figure 3:
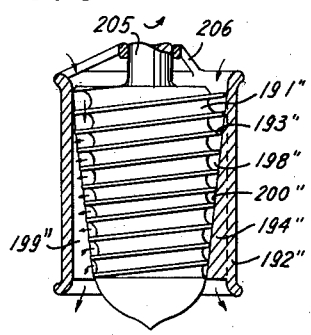
Figure 4:
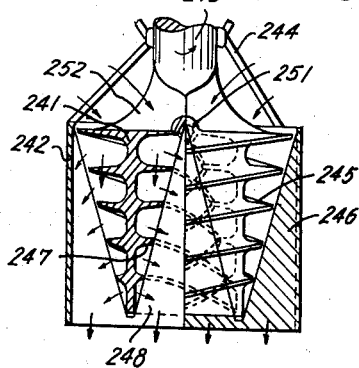
Figure 5:
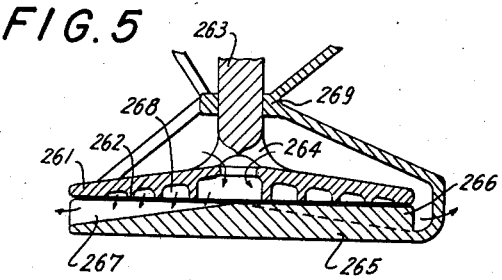
Figure 6:
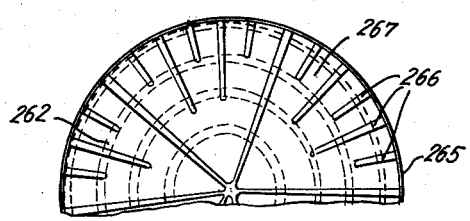
Figure 7:
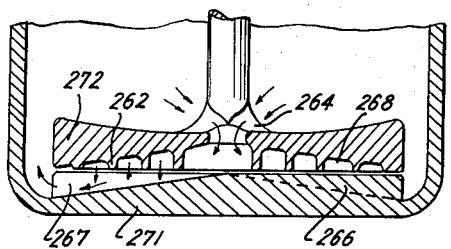

In the drawing:

FIG. 1 is a longitudinal section of a mixer for continuous operation according to the invention, FIG. 2 is a vertical section of a batch mixer, FIGS. 3 and 4 are vertical sections of two different stirrers, FIG. 5 is a section of another stirrer, FIG. 6 is a partial top plan view of the stationary component of the stirrer of FIG. 5, and FIG. 7 is a vertical section of still another stirrer, similar to that of FIG. 5.

The examples of the embodiments illustrated in the drawing relate to apparatus in which only one component of the mixer or stirrer is rotated whereas the other component or components is or are stationary. The same or similar structures are applicable to devices in which no component is rotated at all but a medium is pumped or moved through e.g. by natural convection.

A stirrer or mixer of the illustrated type with only one rotating component is, of course, simpler in construction than an apparatus with both components rotatable. It is advantageous in many instances and has a wide range of applications where it is superior in its quality of mixing to conventional apparatus.

Whereas the rotatable component is to be provided with helical or otherwise curved grooves which urge the medium ahead, such curved grooves in a stationary component would not exert a forward drive and would, in fact, cause a resistance against the forward movement of the medium. In order to reduce this resistance to a minimum, the grooves of the stationary component are formed, according to the invention, as paths of least resistance, e.g. by extending the grooves along the straight generating lines of a conical interface between the stationary and the rotatable components. The apex angle of the conical interface may, dependent on the application, have a value larger than zero up to 180 degrees. At 180 degrees of the apex angle, the interface is a flat plane with grooves in radial directions. It is also possible to use for the interface an other than conical surface, that means, to have the interface formed in general by parallel surfaces of revolution whose generatrices form an apex angle greater than zero. Quite in general, according to the invention, the grooves of the stationary component will have their axis in planes which include the axis of the apparatus.

It will be understood that in each instance the rotatable component with its helical or spiral thread creates the forward driving force to which the medium is subjected in both components.

Referring now to the drawing, FIG. 1 is a section through a continuous mixer with a stationary outer component. This mixer is useful as extruder, mincer, crusher, and for many other applications. The inner screw component 191 is rotatably mounted at 204 and its shaft 203 may also be journaled in a bearing (not shown) in the stationary casing 192. The inner component is provided with a helical thread 193, which comprises a feed-section 195 supplied with the medium to be mixed through the hopper 196, and further the material-transfer section 197, in which the cross-sectional area of the helical grooves 198 decreases from maximum to zero. In the same section, the stationary outer casing 192 has vanes 194 forming substantially axially directed grooves 199, which are substantially straight and which increase in cross-sectional area from zero at the beginning of section 197 to a maximum cross-section at the end opposite the zero cross-section of the internal screw component. 201 is a breaker-plate with openings 202 for the exit of the mixed material.

In operation, material entering through hopper 196 is conveyed forward in the feed-section 195 of the screw. In the working section 197, owing to the gradual reduction of groove-cross-section 198, all the material is forced to transfer into the outer component 192, the straight grooves of which increase in complementary fashion from zero to maximum at the end portion 199, according to the principle of convergence-divergence. Accordingly, every particle of the throughput has to pass through the transition zone 200 between the rotating and stationary components. This ensures suitable treatment according to the state of the material, e.g. crushing for lumps, mincing for fibers, kneading for doughs, mixing for viscous and other fluids, both by the occurrences in the transit zone and by the vortices and other phenomena produced in the grooves themselves.

On account of the continuously conical interface 200, the inner component may be axially shifted for an adjustment of the clearance between the two components. Whereas in this manner the mixing in the transit zone can be affected, an adjustment of the speed of rotation will change the throughput. Also affected is the heat-input owing to the mechanical working which is uniform because all particles are subjected to the same treatment. Where required, cooling and/or heating may be provided in one or both components. The intensive and ordered intermixing ensures an outstanding heat transfer.

An additional section in which a return transfer of the treated medium from the outer to the inner component takes place, may be provided so as to complete a full cycle of material transfer. Several such complete or partial cycles may be provided.

It will be understood that the cross-sectional shapes of grooves, the numbers of grooves and the like in the rotatable helical screw component as well as in the stationary component may be so selected as to suit the intended application of the device and the prevailing conditions of operation. For instance, there may be any number of grooves in the stationary component, from a large number to a small number compared to the rotatable component. A large number would produce a large number of thin slices or elements being taken off the decreasing groove-content of the transporting helix and being mixed. Incidentally, a large number of grooves would cause a greater driving force whereas a small number would have a smaller driving force as a consequence.

Groove cross-sections in the outer component may have an undercut in one side of the groove, or in both sides. Such undercuts would be useful in a mincer-application, or in an application where the rotation of the medium in the straight grooves is of importance as e.g. when feeding liquid layers to a heat transferring wall.

FIG. 2 is a section through a batch-mixer with vertical axis.

The internal rotatable component 191' has the helical thread 193' on its operative surface, while the outer component 192' is stationary and has straight vanes 194 forming grooves 199, the center lines of which are generating lines of a cone surface. The cross-sections of the grooves 198 in the inner component decreases from a maximum at the top to zero at the bottom, while in complementary fashion, the cross-sections of grooves 199 increase from zero at the top to maximum at the bottom.

The entrance hopper 211 is left open in this embodiment although a removable cover may be provided. With the shaft 215 rotating as indicated, the medium fed into the hopper will be transported downwards by the inner screw component 191'. As the medium cannot escape through the bottom cover 212, it has then to flow up the straight grooves of the outer component 192'. Since thus the material in both components flows in the direction of decreasing groove cross-secton, a simultaneous down and up transfer of the material takes place, that means, a circulation of material wherein each component simultaneously acts as giver and taker. Thereby a most intense interpenetration and separation of all particles of the charge is accomplished, due to impacts with opposite velocities in the three mutually normal directions, viz., (i) in the radial direction owing to opposite extrusions, (ii) in the circumferential directions owing to the rotation of the inner components, and (iii) in the axial direction owing to oppositely directed driving forces. No particle can escape this treatment because of the changing groove cross-sections between maximum and zero. This results in a brief mixing time. When the mixing or other operation is completed, the material is discharged through openings 213 provided with valve means (not shown), the discharge proceeding due to the pumping action of the inner screw component. Alternatively, a central opening 214 may be provided, also with a valve-means (not shown). Owing to the frusto-conical interface 200, adjustment of the clearance is possible through an axial shift of the screw in order to regulate the intensity of the mixing phenomena. Further adjustments can be made by changing the speed of rotation of the screw.

Surfaces of revolution other than frusto-conical may form the interface 200 between the components, in which case the axes of the grooves in the non-rotating components are preferably the lines of intersection of these surfaces of revolution and planes which include the axis of rotation of the apparatus.

Furthermore, the bottom of the internal screw may be formed as a spiral, as it will be made fully described hereinafter with reference to FIG. 5 and the internal surface of the cover 212 may be formed with an opposite spiral or with radial vanes defining grooves which also vary in complementary fashion between maximum and zero values so as to provide mixing action at the bottom and to utilize the otherwise inactive surfaces.

It has been proved in practice and will be understood that the mixers hereinbefore described can be applied to all kinds of chemical mixing, for all kinds of chemical reactions, for catalysis and the like, with efficiencies not obtainable with conventional apparatus. Likewise the mixers can be used for preparing solutions of materials ordinarily soluble only with difficulty, of colloids and the like, and for crushing, mincing, and many other applications.

In order to provide for a heat transfer which may be required for exothermic and endothermic chemical reactions and many other purposes, e.g. a tube 215' may be inserted through the hollow shaft 215 in a well known manner for the admission of a cooling or heating medium into an inner hollow space of the rotatable component. Furthermore, an annular heat exchange passage may be provided in an outer casing 223 with an entrance at 217 and an exit port at 218.

FIG. 3 shows an embodiment of the invention which may be used as a stirrer to be inserted into a vat or vessel for chemical reactions, dissolution of salts and the like, or emulsification, aeration, and the like.

The inner component 191" provided with the screw thread 193" is rotatable through shaft 205 while the outer component 192", which has the straight vanes 194", is held non-rotatable in frame 206. The grooves 198" formed by the helical thread of the rotatable component decrease from maximum to zero cross-section from top to bottom, while the grooves 199" of the non-rotating component increase from zero to maximum in complementary fashion. A frusto-conical interface 200" is shown which renders an adjustment of the clearance through an axial shift of the inner component possible, although differently shaped surfaces of revolution about the axis may be applied. From the description of operation of the preceding embodiments it will be understood that this stirrer provides very effective intermixing affecting all particles of the throughput as well as vigorous pumping action. Hence, the fluid in which the stirrer is immersed in a vat will be mixed very effectively, as well as cycled vigorously.

Double thread screws are shown in the present examples although single thread screws or other multi thread screws, or screws with different number of threads along their length may be used as also interrupted screws, i.e. screws interrupted by gaps, or series of vanes forming screws in aggregate, or the like.

FIG. 4 is a section through a stirrer embodiment which provides a throughput and mixing action all over the cross-sectional area of the outer component. The interior rotatable component 241 is tubular and has on its outside the helical thread 245 co-operating with the axial vanes 246 in the outer component 242, whereas on the inside of the rotary component 241 a helical thread 247 co-operates with an innermost set of axial vanes 248 which also form part of the non-rotatable outer component or casing 242. The threads 245 and 247 are right handed, and thus advance in a common axial and circumferential direction. The shaft 243 which drives the inner component 241 is connected to the latter through a frame 252 providing access to the screws 245 and 247 at the top for the fluid medium to be stirred or mixed. A frame 244 carries the stationary component and locates the shaft in a bearing. The rotary component 241 is further centered in the casing 242 by a point or ball bearing 251. Both the helices of component 241 have grooves of cross-sectional areas reducing from a maximum at the top to zero at the bottom, whereas the straight vanes 246 and 248 form axial grooves increasing in complementary fashion from zero at the top to a maximum at the bottom. With the direction of rotation as indicated, this stirrer stirs and transports all particles of the medium over the cross-section contained within the stationary component 242. For the part unit at the outside, more vanes may be provided than for the inside unit.

Consideration of FIG. 4 shows that such a device can easily be made from sheet metal. As to the rotatable component, the helical surfaces of the two threads here shown can be formed in one piece for each of the two threads, and the inner wall can be formed of two helical strips, the whole being welded together. The outer component is very easily produced in that e.g. every second outer vane extends from the top of the inner side of the outer wall of the stationary component downwards to short of the bottom of the rotatable component 241 whereas the vanes intermediate each pair of the aforementioned vanes extend fully as far as the bottom of the rotatable component. Interiorly of the rotatable component, the inner stationary vanes are in planes coinciding with the planes of the mentioned intermediate vanes so that they may or may not be integral with the vanes of the same planes, respectively, whereby the number of grooves inside the rotatable component is half that of the outer vanes. The inner vanes carry on their top ends the bearing 251. The point contact at bearing 251 provides excellent centering, and an adjustment of the clearance can be effected by an adjustment of the axial position of this bearing.

FIG. 5 shows an embodiment of the mixer as a stirrer or emulsifier with a flat plane interface between a rotating component 261 and a non-rotating component 265. Component 261 has the spiral thread 262 and is mounted for rotation on the shaft 263 by means of spokes 264 which leave a central entry for the medium. The non-rotating component 265 has radial vanes 266 which, as shown by the plan view of FIG. 6 are of different lengths to provide reasonable widths of grooves 267 between them. According to the present invention, the grooves 268 of the rotating component vary from maximum cross-sectional area at the center to zero cross-sectional area adjacent the rim, while the facing radial grooves 267 vary in cross-section in complementary fashion from zero cross-section at the center to a maximum at the rim. The non-rotating component is rigidly connected with frame 269 in which the bearing for the rotating shaft is journaled.

FIG. 7 shows an embodiment similar to the preceding one. The stationary component is formed by the bottom of a vessel 271 with the same kind of blades 266 and grooves 267 as in FIG. 5. The rotary component 272 is shaped somewhat different from that of FIG. 5 although it has the same type of central entry adjacent the spokes 264 and spiral thread 262 with grooves 268 as in that figure. The particular shape of the rotary component will facilitate circulation or rather eliminate dead spots. It is also to be noted that the structure can provide for an extremely high and adjustable coefficient of heat transfer through the bottom of the vessel 271 whereby the heating of all the medium can be ensured.

It will be apparent to those skilled in the art that many modifications and alterations of the structure shown and described hereinbefore can be made without departure from the spirit and essence of the invention which for that reason shall not be limited but by the scope of the appended claims.

I claim:

1. An apparatus of the character described comprising a stationary member; a member rotatable about an axis relative to said stationary member, said members having respective opposite faces extending about said axis; vane means on each of said faces projecting toward the other face, said vane means jointly defining an interface, the vane means on one of said faces defining an elongated helical groove having a plurality of turns centered in said axis and juxtaposed along said interface, each of said turns having a cross-sectional area greater than the cross-sectional area of a turn juxtaposed in one direction relative to said axis, and smaller than the cross-sectional area of a turn juxtaposed in the opposite direction, whereby the cross-sectional area of said groove decreases from a maximum to a minimum in said one direction; and the vane means on the other face defining a plurality of substantially straight grooves elongated along said interface in respective axial planes angularly offset from each other about said axis, the cross sectional area of each substantially straight groove increasing longitudinally from a minimum to a maximum in said one direction.

2. An apparatus as in claim 1, wherein said one face is on said rotatable member.

3. An apparatus as in claim 2, wherein said interface is conical.

4. An apparatus as in claim 2, wherein said minimum cross section of each groove is substantially zero.

5. An apparatus as in claim 2, wherein said rotatable member and the vane means on the face thereof constitute a worm and said stationary member is a barrel surrounding said worm, the grooves of said stationary member extending parallel to said axis.

6. An apparatus as in claim 2, wherein said rotatable member is substantially disc-shaped, and the grooves of said stationary member are elongated substantially at right angles to said axis and increase in cross-sectional area in a direction away from said axis.

7. An apparatus as claimed in claim 3 in which said rotatable member surrounds said stationary member, said conical surfaces are substantially parallel, and said grooves in said stationary member are straight and parallel to said axis.

8. An apparatus of the character described comprising an outer stationary member; an inner stationary member defining with said outer member a space of annular cross-section; a tubular intermediate member rotatable in said space about an axis and having an outer face and an inner face respectively opposite corresponding faces of said stationary members; vane means on each face of said intermediate member defining an elongated helical groove and a substantially conical surface enclosing said groove; and vane means on each of said corresponding opposite faces defining a plurality of axially elongated substantially straight grooves and a substantially conical surface enclosing said substantially straight grooves, the last mentioned grooves being angularly spaced about said axis, said helical grooves and said substantially conical surfaces being substantially coaxial, said helical grooves decreasing in cross sectional area in an axial direction from a maximum to a minimum, and said axially elongated grooves increasing in cross section in said axial direction from a minimum to a maximum.

9. An apparatus as in claim 8 wherein said helical grooves advance in a common axial and circumferential direction.

References Cited in the file of this patent

UNITED STATES PATENTS

| | | | |
|---|---|---|---|
| 570,745 | Cleveland | Nov. 3, | 1896 |
| 679,884 | Burton | Aug. 6, | 1901 |
| 2,242,364 | Montanari | May 20, | 1941 |
| 2,685,853 | Schlick | Aug. 10, | 1954 |
| 2,744,287 | Parshall et al. | May 8, | 1956 |
| 2,770,837 | Reifenhauser | Nov. 30, | 1956 |

FOREIGN PATENTS

| | | | |
|---|---|---|---|
| 649,187 | Germany | Aug. 18, | 1937 |
| 826,838 | Germany | Jan. 7, | 1952 |